United States Patent [19]

Nawrocki et al.

[11] Patent Number: 5,313,502

[45] Date of Patent: May 17, 1994

[54] ARRANGEMENT FOR IMAGING A USEFUL SIGNAL FROM THE FRAME OF A FIRST DIGITAL SIGNAL AT A FIRST BITE RATE INTO THE FRAME OF A SECOND DIGITAL SIGNAL AT A SECOND BITE RATE

[75] Inventors: Rainer Nawrocki, Hamburg; Siegfried Brünle, Esslingen; Wolfgang Ehrlich, Allmersbach, all of Fed. Rep. of Germany

[73] Assignee: ANT Nachrichtentechnik GmbH, Backnang, Fed. Rep. of Germany

[21] Appl. No.: 697,778

[22] Filed: May 9, 1991

[30] Foreign Application Priority Data

May 9, 1990 [DE] Fed. Rep. of Germany ....... 4014813
May 9, 1990 [DE] Fed. Rep. of Germany ....... 4014814

[51] Int. Cl.$^5$ .............................................. H04L 25/36
[52] U.S. Cl. .................................... 375/118; 375/112; 370/102
[58] Field of Search ............... 375/118, 106, 117, 119, 375/112; 370/105.1, 108, 105.3, 102; 369/60

[56] References Cited

U.S. PATENT DOCUMENTS

| | | | |
|---|---|---|---|
| 4,352,181 | 9/1982 | LeDieu et al. | 370/108 |
| 4,596,026 | 6/1986 | Cease et al. | 375/118 |
| 4,731,646 | 3/1988 | Kliem | 375/118 |
| 4,941,156 | 7/1990 | Stein et al. | 375/118 |
| 5,052,025 | 9/1991 | Duff et al. | 375/118 |

FOREIGN PATENT DOCUMENTS 8807300 9/1988 World Int. Prop. O. .......... 375/118

Primary Examiner—Curtis Kuntz
Assistant Examiner—Young Tse
Attorney, Agent, or Firm—Spencer, Frank & Schneider

[57] ABSTRACT

A circuit arrangement for imaging a useful digital signal from a frame of a first digital signal having a first bit rate into a frame of a second digital signal having a second bit rate, where the useful digital signal had been written into a first elastic memory and then read out of the first elastic memory in the frame of the first digital signal using a pulse stuffing technique, and with the frame of the first digital signal containing data representing the average fill level of the first elastic memory. The arrangement includes a second elastic memory, a frame detector for detecting the frame of the first signal and controlling activation of write-in of the useful digital signal from the frame of the first digital signal to the second elastic memory, and a frame generator which generates the frame of the second digital signal and controls activation of stuffing and of read-out of the useful digital signal from the second elastic memory into the frame of the second digital signal. An integrator determines the average fill level of the second elastic memory and a subtracter determines the difference between the average fill levels of the first and second elastic memories. This digital difference is fed to a digital control circuit, which includes a digital filter and a pulse density modulator that makes a stuffing decision as a function of the output of the digital filter. Each stuffing decision is input to the frame generator.

6 Claims, 3 Drawing Sheets

ARRANGEMENT FOR IMAGING A USEFUL SIGNAL FROM THE FRAME OF A FIRST DIGITAL SIGNAL AT A FIRST BITE RATE INTO THE FRAME OF A SECOND DIGITAL SIGNAL AT A SECOND BITE RATE

CROSS-REFERENCE TO RELATED APPLICATIONS

This application claims the priority of Federal Republic of German Application Ser. No. P 40 14 813.0 filed May 9th, 1990, and German Application Ser. No. P 40 14 814.9 filed May 9th, 1990, which are incorporated herein by reference.

BACKGROUND OF THE INVENTION

The present invention relates to an arrangement for imaging a useful signal from the frame of a first digital signal at a first bit rate in the frame of a second digital signal at a second bit rate by means of the pulse stuffing technique, with the bit rates of the first and second digital signals being greater than the bit rate of the useful signal. The invention also relates to a method of using such an arrangement.

If a given digital signal is to be transmitted at a bit rate other than its original bit rate, the pulse stuffing method is employed. Essentially two variations of pulse stuffing are known: positive stuffing and positive-zero-negative stuffing. In order to recover the original digital signal, the pulse stuffing process must be reversed again and the clock pulse frequency must be recovered. Usually the clock pulse frequency is smoothed only incompletely and is encumbered by a phase modulation, the waiting time jitter.

D. L. Duttweiler discloses, in an article entitled "Waiting Time Jitter" published in The Bell System Journal, Vol. 51, No. 1, 1972, pages 165-207, a synchronizer and a desynchronizer for positive stuffing. The desynchronizer includes an elastic memory into which a digital signal A is written and from which a digital signal D is read out. A write-in counter, which counts the bits of data of digital signal A that are written into the elastic memory, counts with the aid of the stuffing information in such a manner that it is a precise duplicate of the read-out counter in the synchronizer. The read-out counter which indicates when reading out of the elastic memory is taking place, receives its pulses from a voltage controlled oscillator. A phase comparator compares the phases of the write-in counter and the read-out counter to provide a measure of the phase difference between the two counters. The output of the comparator is filtered and fed to the voltage controlled oscillator. The desynchronizer thus operates like a phase locked loop circuit and smooths the gaps in the clock pulse of the digital signal produced by the stuffing bits. Analog phase locked loop circuit require a relatively large amount of space and power.

If a useful signal is to be stuffed over from the frame of a first digital signal into the frame of a second digital signal, the useful signal is initially recovered with the aid of a phase control loop. The recovered useful signal exhibits waiting time jitter. This recovered useful signal can then be mapped into the frame of the second digital signal.

SUMMARY OF THE INVENTION

Based on this state of the art, it is an object of the present invention to provide a circuit arrangement with which it is possible to stuff a useful signal from a first digital signal having a first frame and a first bit rate into a second digital signal having a second frame and a second bit rate. It is a further object of the invention to provide a method of use for the arrangement.

This is accomplished by a circuit arrangement for imaging a useful signal from a frame of a first digital signal having a first bit rate into a frame of a second digital signal having a second bit rate, where the useful signal had been first written into a first elastic memory and then read out of the first elastic memory in the frame of the first digital signal using a pulse stuffing technique, and with the frame of the first digital signal containing data representing an average value of a fill level of the first elastic memory. Such an arrangement includes a second elastic memory, a frame detector for detecting the frame of the first signal and controlling activation of write-in of the useful signal from the first signal to the second elastic memory, a frame generator which generates the frame of the second digital signal, controls activation of read-out of the useful from the second elastic memory into the frame of the second signal and performs stuffing in the frame of the second signal in response to a stuffing decision. An integrator is provided for determining an average value of the fill level of the second elastic memory. A subtracter determines the difference between the respective average values of the first and second elastic memories, and outputs a digital difference signal to a digital filter which low pass filters the difference signal. The low pass filtered signal is input to a pulse density modulator which makes the stuffing decisions as a function of the values of the output of the filter. Each stuffing decision is input to the frame generator. In use, the first digital signal could be transmitted from the synchronizer to the arrangement over a transmission line.

The use of a digital control circuits obviates the need for analog phase locked loop arrangements.

With the circuit arrangement according to the invention it is possible in one step to stuff a useful signal from a first digital signal having a first frame into a second digital signal having a second frame. The bit rate of the useful signal is here lower than the bit rates of the first and second digital signals. The system does not employ a desynchronizer first and then a synchronizer, each having an elastic memory; rather, only one elastic memory is required. Moreover, no analog phase control circuit is necessary. With the aid of the disclosed arrangement, the average fill level of the elastic memory of the synchronizer transmitted to the arrangement is utilized to minimize waiting time jitter.

According to the prior art, a signal is transmitted using a stuffing technique implemented by performing stuffing in a synchronizer prior to transmission and destuffing at a desynchronizer after transmission. However, information as to whether stuffing took place or not is transmitted from the synchronizer to the desynchronizer in 1-bit steps by means of the stuffing information in each stuffing frame (a frame is typically includes a plurality of stuffing frames, one stuffing opportunity being provided in each stuffing frame). This may create high waiting time jitter. If the output signal of a synchronizer has a sufficient amount of free spaces so that additional information are transmitted, the average fill level of the elastic memory can be transmitted. If this average fill level is utilized to control the control circuit (lowpass filter and pulse density modulator) of the arrangement according to the invention, phase correction can be performed and the waiting time jitter can be reduced. To implement this method it is necessary to precisely determine, and then to compare, the average fill levels of the elastic memories of the synchronizer and the circuit arrangement.

The circuit arrangement operates according to the following stuffing method: momentary values of the fill level of the elastic memory in the synchronizer are determined at several points in time within the frame of an output signal A(D) of the synchronizer, and the values are accumulated in the synchronizer. The accumulated value, which represents the average fill level of the elastic memory in the synchronizer, is transmitted to the circuit arrangement within the frame of the signal A(D) once for each stuffing frame. There an average value for the fill level of the elastic memory of the circuit arrangement is determined by accumulation of momentary values at the same supporting locations in the frame of the signal A(D). The digital control circuit in the arrangement is controlled by a result of comparison of the average values of the fill levels of the elastic memories in the synchronizer and in the arrangement, respectively. The following criterion is of advantage for a selection of the supporting locations for determining the fill level of the elastic memory in order to obtain the lowest possible waiting time jitter: The supporting locations in each stuffing frame of digital signal A(D) should be as equidistant as possible. The supporting locations should be distributed over the entire stuffing frame. Such a method of obtaining average fill levels is described in detail in the present applicants' copending U.S. application entitled "Method of Reducing Waiting Time Jitter" Ser. No. 07/697,999 filed on the same date as the present application, the disclosure of which is incorporated herein by reference.

BRIEF DESCRIPTION OF THE DRAWINGS

These and other features and advantages of the invention will be further understood from the following detailed description of the preferred embodiments with reference to the accompanying drawings in which.

DESCRIPTION OF THE PREFERRED EMBODIMENTS

Figure 2:
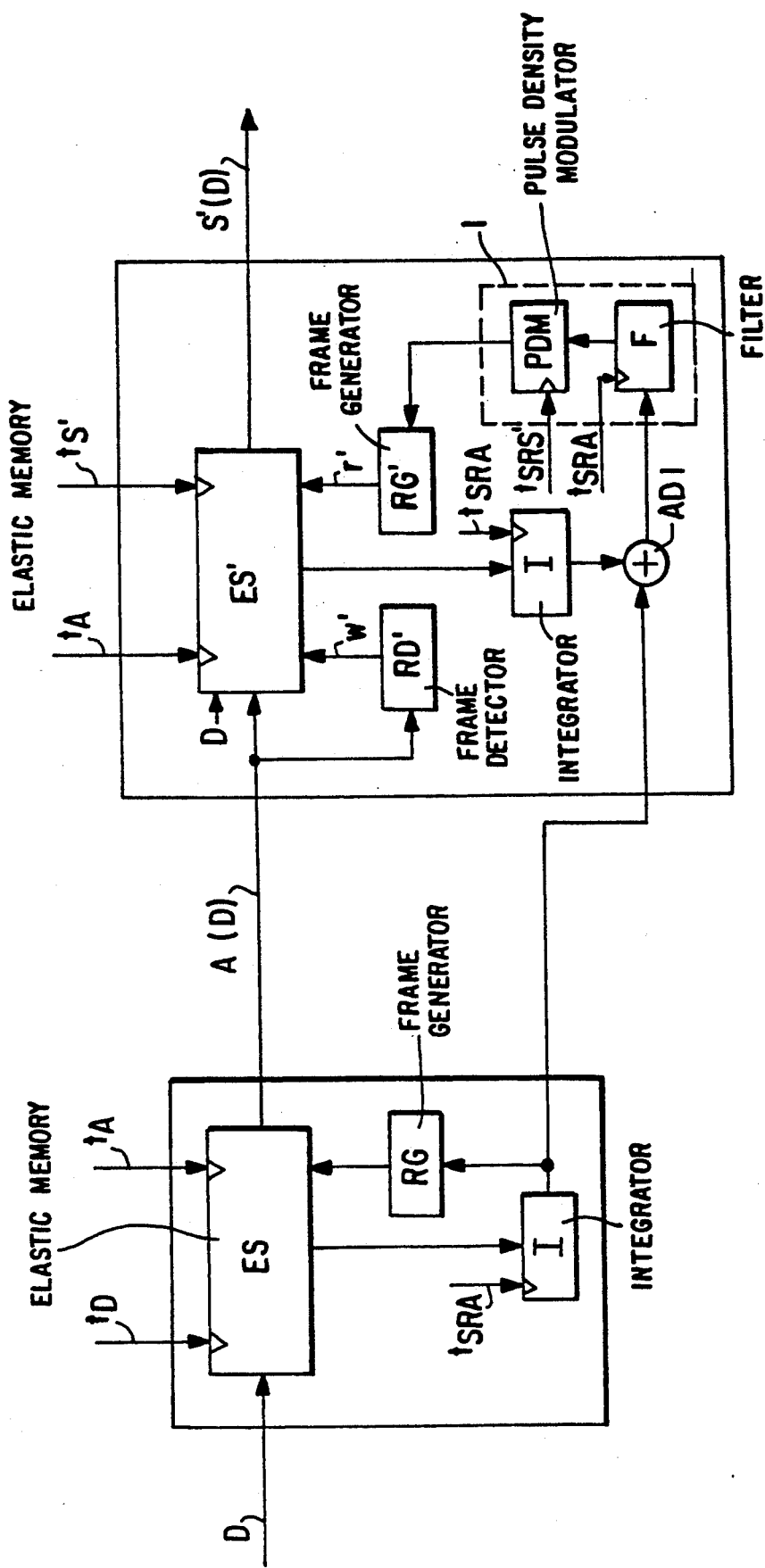
FIG. 2 shows the interaction of the synchronizer and the arrangement.

Referring first to FIG. 2, which shows how a synchronizer Sy and the circuit arrangement CA according to the invention cooperate, an average value of the fill level of an elastic memory ES of the synchronizer Sy is transmitted to the arrangement CA. In the arrangement CA as well, an average value of the fill level of an elastic memory ES' is determined, one of the average values being given as a positive number, the other as a negative number. An integrator I' furnishes the value for the average fill level of the elastic memory ES'. Adder AD1 serves to determine the difference between the transmitted average value of the fill level of the elastic memory ES in the synchronizer and the average value of the fill level of the elastic memory ES' of the arrangement. This difference value is fed to a digital filter F of a second order digital control circuit 1, and regulates, via that filter, the stuffing ratio appearing at the filter output. The digital filter determines the lowpass cut-off frequency and the gain factor of the second order digital control circuit 1. The filtered value, that is, the stuffing ratio, is then fed to a pulse density modulator PDM of the control circuit 1 in which a decision is made either to stuff or not to stuff. The decision is fed to a frame generator RG' which generates the frame of the output signal of the arrangement circuit CA and controls the read-out input of the elastic memory ES'.

Figure 1:
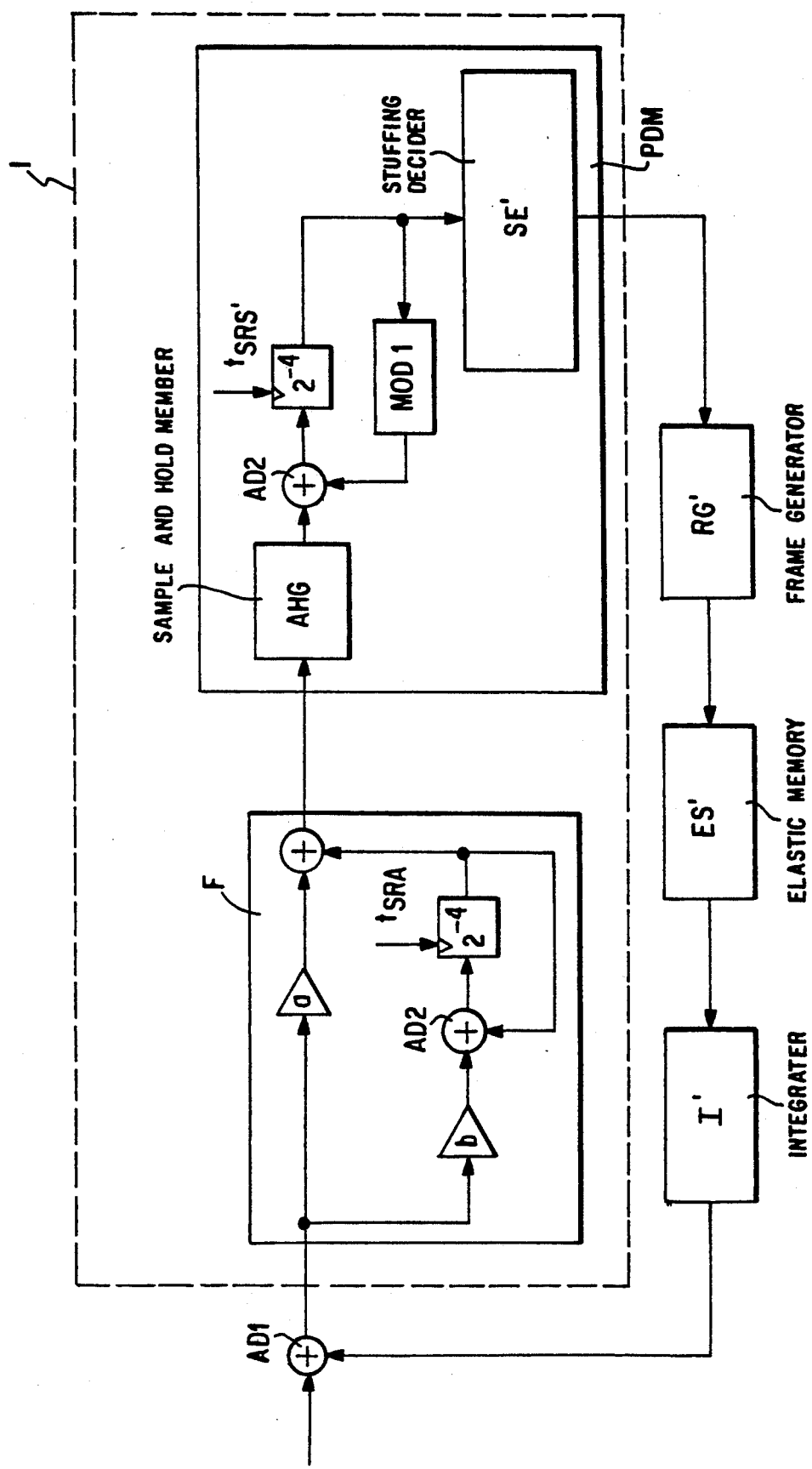
FIG. 1 shows an arrangement according to the invention.

As shown in FIG. 1, the pulse density modulator PDM includes a sample-and-hold member AHG, an adder AD2 at the output of the sample-and-hold member AHG, a delay member $Z^{-1}$ at the output of the adder AD2, a modulo 1 element mod1 and a stuffing decider SE' at the output of the delay member $Z^{-1}$. The modulo 1 element feeds back the delayed output of the delay member $Z^{-1}$ to the adder AD2. Initially, the output of the filter F, that is the stuffing ratio, is fed to the sample-and-hold member AHG. Once per stuffing frame, that is at rate of the clock pulse frequency $t_{SRS}'$ the stuffing ratios are summed up by the adder AD2. If the sum is greater than or equal to one, stuffing takes place by decision of the stuffing decider SE' and the sum is reduced by one by the effect of the modulo 1 element mod1. If the sum performed by the adder is less than 1, no stuffing takes place. The decision whether to stuff or not is made in the stuffing decider SE'.

In use, the synchronizer Sy receives a first digital signal D which is written into an elastic memory ES at a clock pulse frequency $t_D$ to then be imaged into a second digital signal A(D) which is then transmitted to the circuit arrangement CA. In the circuit arrangement CA, the digital signal D must now be recovered from the signal A(D) and imaged into the signal S(D). The bit rates of signals A(D) and A(D) are here greater than those of the signal D. The recovered signal is encumbered by waiting time jitter. The latter can be reduced by the transmission of the average fill level of the memory ES to the circuit arrangement CA and by the evaluation of the fill levels by means of the adder AD1, the digital filter F and the pulse density modulator PDM as described above.

FIG. 2 shows the most important components of the synchronizer Sy and the circuit arrangement CA, including the filter F and the pulse density modulator PDM in block circuit diagram form. The blocks of FIG. 2 correspond in their arrangement to the units describe above with reference to FIG. 1. Moreover, the circuit arrangement CA also includes a frame detector RD' which detects the frame of digital signal A(D) and controls the write-in input w' of an elastic memory ES'. Signals A(D) and A(D)' each contain the useful signal D which is written with gaps into the elastic memory ES', depending on the given frame of the signal A(D) in which it was supplied, and is read out with gaps. The gapped writing-in of the useful signal is activiated by way of the write-in input w' of the elastic memory ES' and the gapped reading-out is activated by way of its read-out input r'. The elastic memory inserts the required synchronizing and frame bits into the gaps in the output signal of the elastic memory as they were created by way of the write-in input w'. As noted above, the values of the fill levels of elastic memories ES and ES' are directed opposite to one another (one is positive and the other negative) and are added in an adder AD1, with the sum value regulating the stuffing ratio via the digital filter F. From this stuffing ratio, the pulse density modulator PDM derives the stuffing decision.

Figure 3:
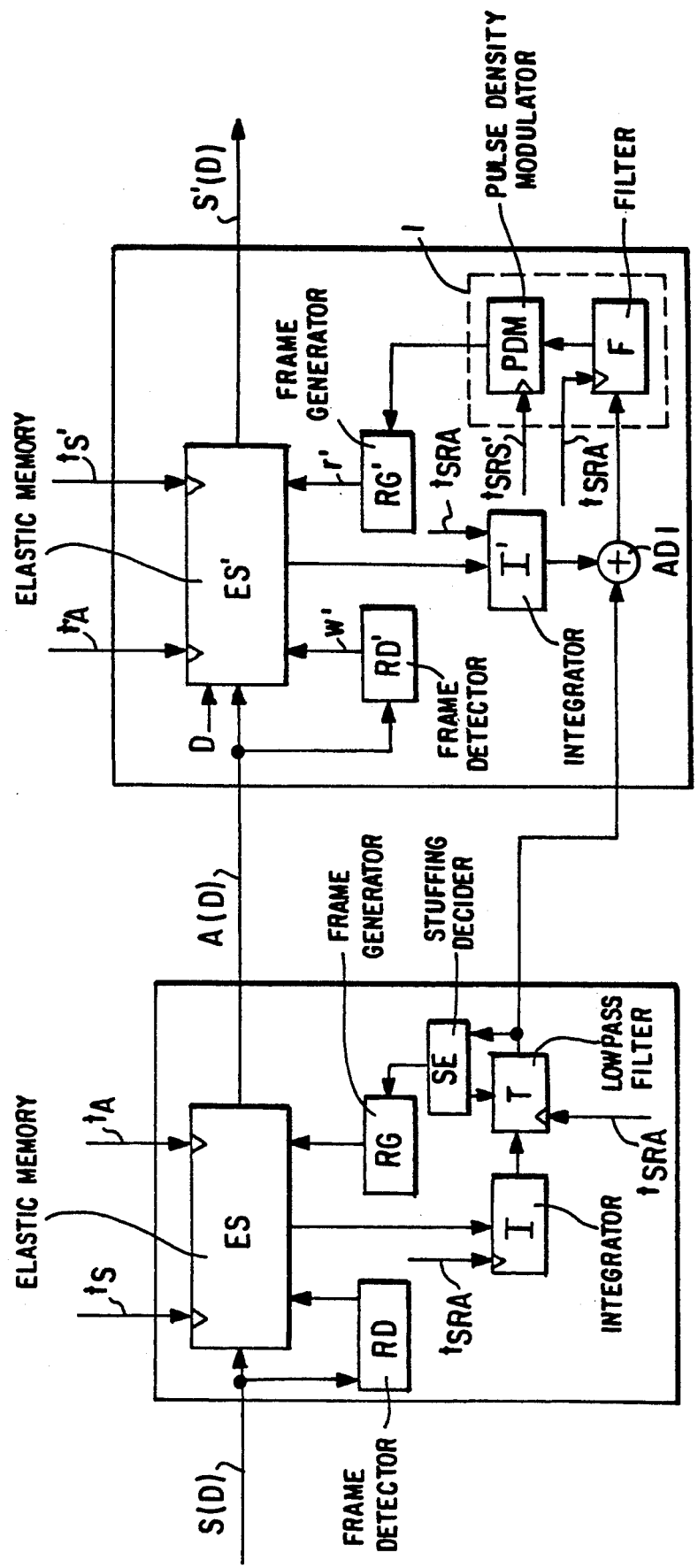
FIG. 3 shows a structure for stuffing a useful signal from a first digital signal S(D) into a second digital signal A(D) and back into the first digital signal.

Referring now to FIG. 3, the "synchronizer" associated with the circuit arrangement CA may also be constructed for stuffing over the useful signal D into the frame of a signal A(D) when it arrives in the frame of a signal S(D). The useful signal D, which has an original bit rate $t_D$ which is less than those ($t_S$ and $t_A$) of the signals S(D) and A(D), is written with gaps into the elastic memory ES. A frame detector RD detects the frame of the digital signal S(D) and controls the write-in activation of the elastic memory ES. From the elastic memory ES, the useful signal D is read out and inserted into the frame of the signal A(D). The digital signal A(D) has a stuffing frame frequency $t_{SRA}$. In each stuffing frame it is possible to stuff once. A frame generator RG is provided which generates the frame of the signal A(D) and controls the read-out activation of the elastic memory ES.

The momentary fill level of the elastic memory ES is determined with the use of two counters, a sampler and a difference circuit in the manner described in the applicants' above-mentioned copending U.S. application Ser. No. 07/699,999. The method is basically as follows: the two counters include a write-in counter which advances its count by one whenever a bit is written into the elastic memory ES, and a read-counter which advances its count by one whenever a bit is read out of the elastic memory ES. The sampler is arranged to sample whichever of the counters is counting at the lower rate and to sample at the rate of the counter which is counting at the higher rate. A difference circuit determines successive differences (comparison values) between the sampled counts and the counts of the counter which counts at the higher rate, this difference representing the momentary fill level of the elastic memory ES.

In order to determine the average fill level of elastic memory ES, which should be determined and transmitted once per stuffing frame, the momentary fill levels are accumulated in an integrator I. It is not necessary during the accumulation to provide all comparison values as summands. The accumulation occurs once per stuffing frame, that is at the frequency $t_{SRA}$ of the stuffing frame, this frequency being fed to the integrator I. Thus, the nth output signal of integrator I is the average fill level of elastic memory ES for the nth stuffing frame. This signal is fed to a digital lowpass filter T. The digital lowpass filter is also clocked at the stuffing frame frequency $t_{SRA}$. Its output signal is the average filtered fill level of the elastic memory for the nth stuffing frame. The average filtered fill level can be transmitted to the circuit arrangement according to the present invention as additional information within the frame of digital signal A(D). The average filtered fill level for the nth stuffing frame additionally is fed to a stuffing decider SE which makes a stuffing decision in dependence upon the output signal of the lowpass filter T. The stuffing decision is fed in the form of a correction value to frame generator RG. The stuffing decision is also fed to the digital lowpass filter T in order to correct its output signal.

A stuffing decision is made as follows: positive stuffing is performed if the average filtered fill level of the nth stuffing frame is smaller than a lower threshold. Negative stuffing is performed if the average filtered fill level of the nth stuffing frame is greater than an upper threshold. If the average filtered fill level of the nth stuffing frame lies between the upper threshold and the lower threshold, no stuffing is performed. By using a lowpass filter and feeding in a correction value, the sawtooth shape of the average memory fill level is re-established. In the circuit arrangement according to the invention, the useful signal D is again imaged into the signal S'(D). The configuration of the circuit arrangement which performs this imaging again corresponds to that illustrated in FIG. 2

It will be understood that the above description of the present invention is susceptible to various modifications, changes and adaptations, and the same are intended to be comprehended within the meaning and range of equivalents of the appended claims.

What is claimed is:

1. An arrangement for imaging a useful digital signal from a frame of a first digital signal having a first bit rate into a frame of a second digital signal having a second bit rate, the useful digital signal having been previously written into a first elastic memory, and read out of the first elastic memory in the frame of the first digital signal using a pulse stuffing technique, the arrangement comprising:

(a) a second elastic memory;
    (b) a frame detector for detecting the frame of the first digital signal and controlling an activation of write-in of the useful digital signal from the frame of the first digital signal into said second elastic memory, the frame of the first digital signal containing data representative of an average value of a fill level of the first elastic memory;
    (c) a frame generator, coupled to the second elastic memory, for generating the frame of the second digital signal and controlling an activation of a read-out of the useful digital signal from the second elastic memory into the frame of the second digital signal, said frame generator being responsive to a stuffing decision to perform pulse stuffing in the frame of the second digital signal;
    (d) an integrator means, coupled to the second elastic memory, for determining an average value of a fill level of the second elastic memory;
    (e) a subtraction means, coupled to said integrator means, for determining a difference between the average value determined by said integrator means and the average value of the fill level of the first elastic memory represented in the frame of the first digital signal, and outputting a digital difference signal representative of said difference;
    (f) a digital filter, coupled to said subtraction means, for filtering said difference signal and outputting a filtered difference signal; and
    (g) a pulse density modulator, coupled to said digital filter, for making the stuffing decision as a function of a value of the filtered difference signal and outputting the stuffing decision to said frame detector.

2. An arrangement as defined in claim 1, wherein the frame of the second digital signal includes at least one stuffing frame, said pulse density modulator including:

a sample-and-hold member which receives the filtered difference signal from said filter,
    an adder which is connected to receive an output from said sample-and-hold member and which adds a modulo 1 output of a previous sum of the filtered difference signals to the filtered difference signal which is output from said sample-and-hold member to obtain a current sum which is sampled once per stuffing frame of the second digital signal to produce the previous sum, and a stuffing decider which receives a delayed output from said adder corresponding to said previous sum and which makes the stuffing decision as a function of said previous sum.

3. A method of imaging a useful digital signal from a frame of a first digital signal having a first bit rate into a frame of a second digital signal having a second bit rate, comprising the steps of:

writing the useful digital signal into a first elastic memory of a synchronizer, reading out the useful digital signal from the first elastic memory in the frame of the first digital signal using a pulse stuffing technique, transmitting the first digital signal from the synchronizer to a circuit arrangement which includes a second elastic memory, an integrator, a substracter, a digital filter, a pulse density modulator, a frame detector, and a frame generator;

transmitting data indicative of an average value of a fill level of the fist elastic memory to the circuit arrangement in the frame of the first digital signal;

detecting the frame of the first digital signal and controlling a write-in of the useful digital signal from the frame of the first digital signal into the second elastic memory, using the frame detector;

generating the frame of the second digital signal and controlling an activation of the read-out of the useful digital signal from the second elastic memory into the second digital signal, using the frame generator;

determining an average value of a fill level of the second elastic memory using the integrator;

determining a difference between the average value determined by the integrator and the average value of the fill level of the first elastic memory in the subtracter, and outputting a digital difference signal representative of said difference;

filtering the difference signal in the filter and outputting from the filter a filtered difference signal;

making a stuffing decision as a function or a value of the filtered difference signal in the pulse density modulator; and performing pulse stuffing in the frame of the second digital signal in response to the stuffing decision.

4. A method as defined in claim 3, wherein said step of performing pulse stuffing is performed by said frame generator.

5. A method as defined in claim 3, wherein said step of transmitting the first digital signal comprises the step of transmitting the first digital signal from the synchronizer to the circuit arrangement over a transmission line.

6. A method as defined in claim 3, wherein said step of writing the useful digital signal into the first elastic memory includes writing the useful digital signal into the first elastic memory using a second frame detector of ht synchronizer which detects a frame of an input digital signal containing the useful digital signal and controls a write-in activation of the first elastic memory to write the useful digital signal form the frame of the input signal into the first elastic memory; wherein said step of reading the useful digital signal out of said first elastic memory includes the step of reading out the useful digital signal from the frame of the input signal using a second frame generator of the synchronizer which generates the frame of the first digital signal, which controls a read-out activation of the first elastic memory to read the useful digital signal out of the first elastic memory into the frame of the second digital signal, and which is responsive to an input thereto of a correction value containing stuffing information to perform stuffing in the frame of the first digital signal; and wherein said correction value is determined by the steps of:

integrating the momentary fill levels of the first elastic memory in a second integrator;

lowpass filtering an output of the second integrator with a lowpass filter of the synchronizer; and making a stuffing decision as a function of an output of the lowpass filter and generating the correction value containing stuffing information for the second frame generator.

* * * * *